June 25, 1957     C. E. HAJNY     2,797,281
CONDITION RESPONSIVE CIRCUIT CONTROLLING DEVICES
Filed Aug. 29, 1955
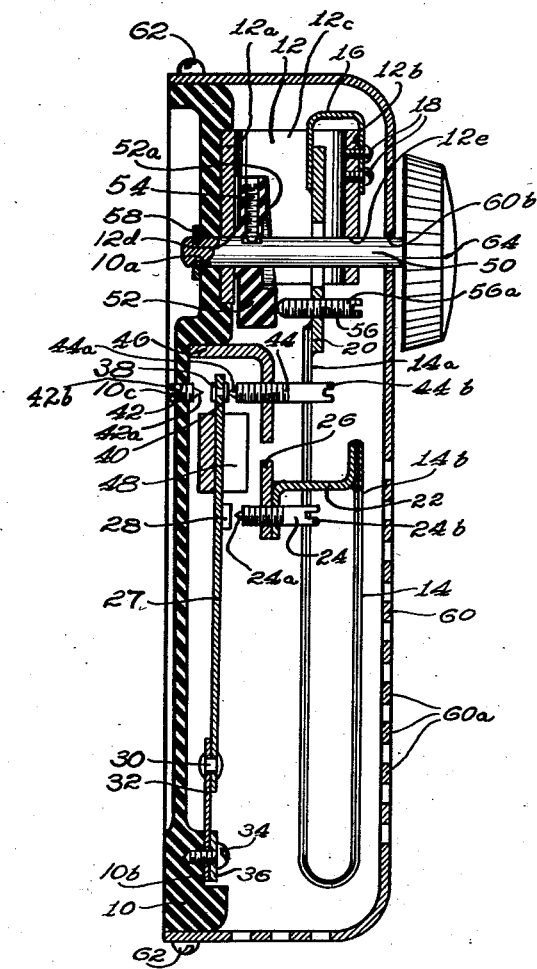
INVENTOR.
Charles E. Hajny
BY
Seegert & Schwalbach
Attys

United States Patent Office 2,797,281
Patented June 25, 1957

2,797,281

CONDITION RESPONSIVE CIRCUIT CONTROLLING DEVICES

Charles E. Hajny, Milwaukee, Wis., assignor to Baso Inc., a corporation of Wisconsin Application August 29, 1955, Serial No. 531,117

9 Claims. (Cl. 200—138)

This invention relates to condition responsive circuit controlling devices and more particularly to two stage temperature responsive electric switches.

In fluid fuel heating apparatus, for example, it has been found desirable to provide a high heat flame whenever the existing temperature within an enclosure, the temperature of which is to be maintained within predetermined limits, is considerably less than the temperature desired therewithin; and to provide a low heat flame whenever the existing temperature is only slightly less than the desired temperature. More specifically, it has been found desirable, as the enclosure temperature drops from that desired, to first utilize the low heat flame and then, in the event that such flame is insufficient to prevent further decrease in temperature, to employ the high heat flame to thereby return the temperature to that desired within the enclosure. Also, upon successful operation of the high heat flame in returning the temperature, it has been found advantageous to change over from the high heat flame to the low heat flame as the desired temperature is approached, thereby preventing overrunning of the temperature to be maintained.

To this end, the present invention provides a condition responsive or thermostatic device which is capable of sensing the differential between the existing temperature and the desired temperature for use in systems affording the aforementioned functions.

A primary object of the present invention, therefore, is to provide a condition sensitive circuit controlling device having several pairs of electrical contacts and operating means therefor including means for insuring operation of the contacts in a predetermined sequence only.

A further object of the present invention is to provide a thermostat of the class described having a bi-metal element which moves in accordance with the differential between an existing temperature and the desired temperature; such movement first actuating one of two pairs of electrical contacts followed by actuation of the other of said pairs of contacts by the force of said bi-metal being transmitted through said one of said pairs of contacts.

A more specific object of the present invention is to provide a thermostat of the class described having a first pair of electrical contacts normally held in a given position by permanent magnet means, a second pair of electrical contacts, and a condition responsive movable member having a first movement for effecting actuation of said second pair of electrical contacts and a second movement for creating a force which is transmitted through said second pair of electrical contacts to overcome said permanent magnet means and actuate said first pair of electrical contacts from one to another of its controlling positions.

An even more specific object of the present invention is to provide in a thermostat having the aforementioned operational characteristics, adjusting means on said bi-metal element for varying the condition at which the second set of electrical contacts is actuated and thereby also varying the condition at which the first set of electrical contacts is actuated.

Another more specific object of the present invention is to provide in a two stage thermostat, magnetic means which insures operation of several pairs of electrical contacts in a predetermined sequence and which also imparts snap action to such contacts whenever they are moved from one position to another.

The novel features which I consider characteristic of my invention are set forth with particularity in the appended claims. The device itself, however, both as to its organization and mode of operation, together with additional objects and advantages thereof will best be understood from the following description of a specific embodiment when read in connection with the accompanying drawing, in which is shown a thermostatic device embodying the present invention.

Referring to the drawing, numeral 10 designates a base member adaptable to any desired mounting means (not shown) to permit, for example, fastening thereof to the wall of an enclosure the temperature of which is to be controlled. As will hereinafter become readily apparent, it may be desirable if not necessary to construct base member 10 of insulating material depending upon the number of electrical contacts employed and their relative positions.

A U-shaped bracket 12 having leg portions 12a and 12b and an intermediate portion 12c is fixed to the base 10 in any desired manner, such as by welding, brazing, soldering or the use of fastening means. Leg portions 12a and 12b are formed with openings 12d and 12e respectively, for alignment with an opening 10a formed in base 10 as shown in the drawing.

A reversely bent bi-metal element 14 is adjustably mounted on leg portion 12b of bracket 12 by means of a U-shaped yieldable member 16 fastened to said leg portion 12b by means of screws 18. As shown in the drawings, an apertured non-flexible member 20 interconnects flexible member 16 and an end portion 14a of the reversely bent bi-metal element 14, being fastened therebetween in any desired manner such as by welding, brazing or soldering.

Fixed to end portion 14b of element 14, as by welding, soldering, or brazing, is a Z-shaped bracket 22. An adjustable electrical contact member 24 is threaded through the bracket 22 as shown and has an end 24a formed in the shape of an electrical contact. The other end 24b of member 24 is formed with a kerf or screw driver slot for receiving the end of a screw driver or other tool for adjustment of the position of said member 24 relative to bracket 22. Also attached to Z-shaped bracket 22 as by welding, brazing or soldering, is a magnetic member 26 formed of iron or other magnetically permeable material for a purpose to be hereinafter explained.

A movable contact carrier 27 having an electrical contact 28 for cooperation with contact 24a, is pivotally mounted on a ledge 10b formed in base member 10. I prefer contact carrier 27 to be made of relatively inflexible material and to be fastened at one end by rivets 30 or other fastening means to a strip of flexible hinge material 32. In the preferred embodiment shown in the drawing, the flexible hinge material 32 is secured to ledge 10b of base member 10 in any well known manner such as by use of screw 34 and washer 36.

In addition to the aforementioned electrical contact 28, carrier 27 is also provided with oppositely disposed electrical contacts 38 and 40. For cooperation with contact 38, a stationary contact member 42 having one end 42a formed in the shape of an electrical contact and the other end 42b formed with a kerf, is threaded through an opening 10c formed in base 10. An adjustable contact member 44 having one end 44a shaped as an electrical contact and the other end 44b formed with a kerf is provided for cooperation with contact 40 and is threaded through an opening formed in one leg of an L-shaped bracket 46. The other leg of bracket 46 is rigidly fixed to base member 10 in any desired manner such as by welding, brazing or soldering. Bracket 46 is formed of iron or any other suitable magnetically permeable material for a purpose to be hereinafter explained.

Rigidly secured to the contact carrier 27, is a U-shaped permanent magnet member 48 positioned on said carrier so as to magnetically coact with the magnetic members 26 and 46. Attraction sufficient to effect relative movement between the magnet 48 and members 26 and 46 takes place only when the respective magnetic members are within a predetermined distance of said magnet so as to be within the effective portion of the latter's magnetic field.

To provide adjustment of the temperature control point of the subject thermostat, I prefer to employ a rotatable shaft 50 journalled within openings 12d and 12e of bracket 12 and opening 10a of base member 10, said shaft having cam means 52 adjustably positioned thereon as by means of set screw 54. Cam member 52 is formed with an inclined surface 52a for cooperation with an adjustable follower stud 56 threaded through the nonflexible member 20 and formed with a kerf 56a to permit of factory adjustment by the manufacturer for calibration purposes. I prefer to employ a snap ring 58 positioned within an annular groove formed in one end of shaft 50 for cooperation with cam member 52 to retain said shaft in a given longitudinal position with respect to base member 10.

An enclosing cover 60 is secured to base member 10 by suitable means such as screws 62. Cover 60 is formed with apertures or perforations 60a to permit of air circulation therethrough and has an opening 60b for extension therethrough of shaft 50. An adjusting knob 64 is fixed to shaft 50 externally of enclosing cover 60 and in order to indicate the temperature for which the subject thermostat is set, the knob 64 and the cover 60 may be provided with cooperating pointer and indicia means (not shown).

The device shown in the drawing operates as follows:

Electrical contacts 40 and 44a are normally in their engaged or circuit closed position by virtue of the magnetically attractive biasing effect between the magnet member 48 and bracket 46. It will be noted that such attraction between members 48 and 46 also positions electrical contacts 38 and 42a in their unengaged or circuit open position. When the ambient temperature condition is the same as the temperature desired, bi-metal element 14 is shaped so as to position electrical contact 24a in open circuit position with respect to contact 28 and magnet member 26 out of the effective magnetic field of magnet member 48. In such relative position of magnetic members 26 and 48, any magnetic attraction therebetween is overcome by the bi-metal element 14.

As the ambient temperature drops below the temperature to which the thermostat is set, bi-metal element 14, as is well known in the art, deforms accordingly and effects movement of the magnetic member 26 and electrical contact 24a toward contact 28. As the temperature differential between the thermostat setting and the ambient temperature continues to increase, the bimetal element becomes increasingly deformed and magnetic member 26 is gradually moved closer to magnet member 48 until it is within the effective magnetic field thereof, whereupon the magnet member 26 is rapidly drawn to the magnet member 48. Such movement of member 26 causes electrical contact 24a to be moved into engagement with contact 28 with a snap action.

Should the aforementioned differential between the thermostat setting and the ambient temperature continue to increase, bi-metal element 14 will continue to deform thereby exerting a force on contact carrier 27 through bracket 22 and contact member 24. Such force continues to increase with increased deformation of the bi-metal until the magnetic attraction between magnetic members 46 and 48 is overcome, whereupon contact 40 is disengaged from contact 44a with a snap action and contact 38 is moved to engagement with contact 42a with a snap action. During such movement of contacts 38 and 40, electrical contacts 24a and 28 remain engaged since they constitute the force transmitting means between bi-metal element 14 and contact carrier 27.

If, at this point, the aforementioned temperature differential should decrease, the above-described sequence is reversed. That is, bi-metal element 14 then senses the decrease in differential temperature and cause magnetic member 26 to apply a decreasing force on carrier 27 through contacts 24a and 28, whereupon the magnetic attraction between magnet members 46 and 48 eventually overcomes the force exerted on contact carrier 27 by the bi-metal, so that contacts 38 and 42a are moved to open circuit position with a snap action and contacts 40 and 44a are moved to closed position with a snap action. Continued decrease in the temperature differential causes bi-metal element 14 to exert a reverse acting force tending to overcome the magnetic attraction between magnetic members 26 and 48, and when this reverse acting force has increased to the point where such coupling force is overcome, the contact member 24a is moved with a snap action to its open circuit position with respect to contact 28.

In order to change the temperature control point setting of the thermostat shown in the drawing, it is merely necessary to rotate adjusting knob 64 to the desired setting. Such movement rotates cam member 52, and since the biasing effect of U-shaped member 16 causes adjusting screw 56 to follow the inclined surface 52a, the position of the bi-metal element 14, magnetic member 26 and contact 24a is changed by such rotation. The temperature at which the magnetic member 26 is moved to within the effective field of magnet member 48, is thereby changed to effect a corresponding change in the actuating temperature for each of the various pairs of electric contacts.

In order to change the range within which cam member 52 is operable, or more particularly, to facilitate adjustment or alignment of the thermostat by the manufacture, adjusting screw 56 may be longitudinally repositioned with respect to member 20 so that the range of control point adjustment provided by the cam member 52 is thereby shifted.

It will be readily apparent to those skilled in the art that circuit connections can be made to the various contacts and to a heating apparatus capable of affording, for example, a low heating flame and a high heating flame, said connections being such that contacts 24a and 28 control the low flame, while either or both of the other pairs of contacts control the high heat flame. Further, if contacts 38 and 42a are utilized for controlling the high heat flame or heat producing means, it may be desirable to utilize contacts 40 and 44a to terminate the low heat flame or heat producing means provided the particular heating apparatus employed permits operation of only one or the other of such flames or heating means at a given time.

In view of the foregoing it is believed readily apparent that the U-shaped permanent magnet 48 may be formed in two individual parts for individual cooperation with magnetic members 26 and 46; and further that the magnetic field producing means need not be fixed to carrier 27 but may comprise separate field producing means fixed individually to contact members 24 and 44. In the latter event one or more magnetic members would be required on contact carrier 27 to afford the necessary individual magnetic attractions. Such interchangeability of the various magnetic members is intended to form a part of the present invention and to come within the spirit of the appended claims.

I prefer to form bi-metal element 14 of two spaced parallel extents or legs (only one of which is shown in the drawing because of the sectional nature of said drawing). Such extents or legs are interconnected by the member 20 at the end portion 14a and by a transverse extent at the end portion 14b. Further, I prefer to position bracket 22 equally between the parallel legs of the bi-metal 14 to minimize bending and torsional forces which may tend to permanently deform the bi-metal element 14 and thereby deleteriously affect the calibration of the subject thermostat. Such arrangement also affords an efficient means for transmitting the force of the bi-metal element to the various sets of contacts.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In a circuit controlling device, in combination, a member movable in a given direction, a movable contact carrier, a first pair of cooperating contacts comprising a first contact fixed relative to said movable member and a second contact fixed relative to said carrier, a second pair of cooperating contacts comprising a third contact fixed relative to said carrier and a fourth stationary contact, a third pair of cooperating contacts comprising a fifth contact fixed relative to said carrier and a sixth stationary contact, means biasing said carrier to position said third contact in engagement with said fourth contact and to position said fifth contact out of engagement with said sixth contact, movement of said movable member in its said given direction effecting engagement of said first and second contacts, continued movement of said movable member in said given direction moving said carrier against said biasing means to thereby simultaneously move said third contact out of engagement with said fourth contact and said fifth contact into engagement with said sixth contact while holding said first and second contacts engaged.

2. In a circuit controlling device, in combination, a movable member, a contact carrier, a first set of cooperating contacts comprising a contact member fixed to said carrier and a contact member fixed to said movable member, a second set of cooperating contacts comprising a stationary contact member and a contact member fixed to said carrier, and magnetic means comprising cooperating magnet members respectively fixed relative to said carrier and to said stationary contact to afford a force biasing said carrier toward a given position thereof wherein the contact members of said second set of contacts are in one of their cooperating relative positions, application of a predetermined force to said movable member causing the latter to effect a firm engaging force between the contact members of said first set of contacts against the biasing force on said carrier and application thereto of a force greater than said predetermined force overcoming the biasing force on said carrier for moving the contact members of said second set of contacts from said one to another of their cooperating relative positions while maintaining in firm engagement the contact members of said first set of contacts.

3. In a circuit controlling device, in combination, a movable member, a contact carrier, a first set of cooperating contacts comprising a contact member fixed to said carrier and a contact member fixed to said movable member, a second set of cooperating contacts comprising a stationary contact member and a contact member fixed to said carrier, and means comprising a magnet member fixed relative to said carrier and an armature therefor fixed relative to said stationary contact to provide a force biasing said carrier toward a given position wherein the contact members of said second set of contacts are in one of their cooperating relative positions, application of a predetermined force to said movable member causing the latter to effect a firm engaging force between the contact members of said first set of contacts against the biasing force on said carrier and application thereto of a force greater than said predetermined force overcoming the biasing force on said carrier for moving the contact members of said second set of contacts from said one to another of their cooperating relative positions while maintaining in firm engagement the contact members of said first set of contacts.

4. In a circuit controlling device, in combination, an actuating member having an initial position and being movable therefrom, a contact carrier, a first set of normally disengaged cooperating contacts comprising a contact member fixed to said carrier and a contact member fixed to said actuating member, a second set of cooperating contacts comprising a stationary contact member and a contact member fixed to said carrier, and magnetic means comprising cooperating magnet members respectively fixed relative to said carrier, stationary contact member, and actuating member to provide a force biasing said carrier toward a given position wherein the contacts of said second set of contacts are in one of their cooperating positions and to afford an attractive force between the contact members of said first set of contacts upon predetermined movement of said actuating member from its initial position, application of a predetermined force to said actuating member causing said predetermined movement thereof from its said initial position to permit the attractive force between the contact members of said first set of contacts to effect snap action engagement thereof, and application thereto of a force greater than said predetermined force overcoming the biasing force on said carrier for moving the contact members of said second set of contacts from said one to another of their cooperating relative positions with a snap action while maintaining firm engagement of the contact members of said first set of contacts.

5. In a circuit controlling device, in combination, an actuating member having an initial position and being movable therefrom, a contact carrier, a first set of normally disengaged cooperating contacts comprising a contact member fixed to said carrier and a contact member fixed to said actuating member, a second set of cooperating contacts comprising a stationary contact member and a contact member fixed to said carrier, and means comprising a magnet member fixed to said carrier, a first armature therefor fixed relative to said stationary contact member, and a second armature therefor fixed to said actuating member, said magnet member and first armature providing a force biasing said carrier toward a given position wherein the contacts of said second set of contacts are in one of their cooperating positions and said magnet member and said second armature providing an attractive force between the contact members of said first set of contacts upon predetermined movement of said actuating member from its said initial position, application of a predetermined force to said actuating member causing said predetermined movement thereof from its said initial position to permit the attractive force between the contact members of said first set of contacts to effect snap action engagement thereof, and application thereto of a force greater than said predetermined force overcoming the biasing force on said carrier for moving the contact members of said second set of contacts from said one to another of their cooperating relative positions with a snap action while maintaining firm engagement of the contact members of said first set of contacts.

6. In a circuit controlling device, in combination, an actuating member biased to an initial position and being movable therefrom, a contact carrier, a first set of normally disengaged cooperating contacts comprising a contact member fixed to said carrier and a contact member fixed to said actuating member, a second set of cooperating contacts comprising a stationary contact member and a contact member fixed to said carrier, and magnetic means comprising cooperating magnet members respectively fixed relative to said carrier and to said stationary contact to afford a force biasing said carrier toward a given position thereof wherein the contact members of said second set of contacts are in one of their cooperating relative positions, application of a predetermined force to said movable member causing the latter to effect a firm engaging force between the contact members of said first set of contacts against the biasing force on said carrier, application thereto of a force greater than said predetermined force overcoming the biasing force on said carrier for moving the contact members of said second set of contacts from said one to another of their cooperating relative positions while maintaining in firm engagement the contact members of said first set of contacts, termination of application of said forces on said movable member causing the bias thereon to first permit the biasing force on said carrier to return the contact members of said second set of contacts to said one of their cooperating relative positions and subsequently to effect disengagement of the contacts of said first set of contacts by return of said actuating member to its initial position.

7. In a circuit controlling device, in combination, an actuating member biased to an initial position and being movable therefrom, a contact carrier, a first set of normally disengaged cooperating contacts comprising a contact member fixed to said carrier and a contact member fixed to said actuating member, a second set of cooperating contacts comprising a stationary contact member and a contact member fixed to said carrier, and magnetic means comprising cooperating magnet members respectively fixed relative to said carrier, stationary contact member, and actuating member to provide a force biasing said carrier toward a given position wherein the contact members of said second set of contacts are in one of their cooperating positions and to afford an attractive force between the contact members of said first set of contacts upon predetermined movement of said actuating member from its initial position, application of a predetermined force to said actuating member causing said predetermined movement thereof from its said initial position to permit the attractive force between the contact members of said first set of contacts to effect snap action engagement thereof, and application thereto of a force greater than said predetermined force overcoming the biasing force on said carrier for moving the contact members of said second set of contacts from said one to another of their cooperating relative positions with a snap action while maintaining firm engagement of the contact members of said first set of contacts, termination of application of said forces on said actuating member causing the bias thereon to first permit the bias force on said carrier to return with a snap action the contact members of said second set of contacts to said one of their cooperating positions and subsequently to return with a snap action the contact members of said first set of contacts to their disengaged position by return of said actuating member to its initial position.

8. In a circuit controlling device, in combination, a condition responsive bi-metal element deformable in proportion to variation of a given condition, a contact carrier, a first set of cooperating contacts comprising a contact member fixed to said carrier and a contact member fixed to said element, a second set of cooperating contacts comprising a stationary contact member and a contact member fixed to said carrier, and magnetic means comprising cooperating magnet members respectively fixed relative to said carrier and to said stationary contact to afford a force biasing said carrier toward a given position thereof wherein the contact members of said second set of contacts are in one of their cooperating relative positions, a predetermined variation in said given condition effecting predetermined deformation in said bi-metal element to effect engagement of the contact members of said first set of contacts against the biasing force on said carrier, further variation in said given condition effecting greater deformation in said bi-metal element and hence a force between the contacts of said first set of contacts overcoming the biasing force on said carrier and moving the contact members of said second set of contacts from said one to another of their cooperating relative positions while maintaining in firm engagement the contact members of said first set of contacts.

9. In a circuit controlling device, in combination, a condition responsive bi-metal element deformable in proportion to variation of a given condition, a contact carrier, a first set of cooperating contacts comprising a contact member fixed to said carrier and a contact member fixed to said element, a second set of cooperating contacts comprising a stationary contact member and a contact member fixed to said carrier, magnetic means comprising cooperating magnet members respectively fixed relative to said carrier and to said stationary contact to afford a force biasing said carrier toward a given position thereof wherein the contact members of said second set of contacts are in one of their cooperating relative positions, a predetermined variation in said given condition effecting predetermined deformation in said bi-metal element to effect engagement of the contact members of said first set of contacts against the biasing force on said carrier, further variation in said given condition effecting greater deformation in said bi-metal element and hence a force between the contacts of said first set of contacts overcoming the biasing force on said carrier and moving the contact members of said second set of contacts from said one to another of their cooperating relative positions while maintaining a firm engagement the contact members of said first set of contacts, and means for adjusting the amount of deformation of said bi-metal element necessary to effect engagement of the contact members of said first set of contacts for altering the variations in said given condition necessary to effect engagement of the contact members of said first set of contacts and to effect movement of the contact members of said second set of contacts from said one to said another of their cooperating positions.

References Cited in the file of this patent

UNITED STATES PATENTS

| | | |
|---|---|---|
| 1,477,350 | Hoeschen | Dec. 11, 1923 |
| 2,417,911 | Carlson | Mar. 25, 1947 |
| 2,584,079 | Aubert | Jan. 29, 1952 |